United States Patent
Louboutin et al.

(10) Patent No.: US 9,501,100 B2
(45) Date of Patent: Nov. 22, 2016

(54) COMMUNICATING SENSOR DATA BETWEEN ELECTRONIC DEVICES

(75) Inventors: Sylvain R. Y. Louboutin, Cupertino, CA (US); Robert J. Walsh, Sunnyvale, CA (US); Shyam S. Toprani, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1228 days.

(21) Appl. No.: 12/967,917

(22) Filed: Dec. 14, 2010

(65) Prior Publication Data

US 2012/0083911 A1    Apr. 5, 2012

Related U.S. Application Data (60) Provisional application No. 61/388,465, filed on Sep. 30, 2010.

(51) Int. Cl.
| | |
|---|---|
| G06F 3/00 | (2006.01) |
| G06F 1/16 | (2006.01) |
| G06F 13/38 | (2006.01) |
| G06F 3/06 | (2006.01) |
| G06F 13/12 | (2006.01) |

(52) U.S. Cl.
CPC ............ *G06F 1/1632* (2013.01); *G06F 3/002* (2013.01); *G06F 3/0601* (2013.01); *G06F 13/122* (2013.01); *G06F 13/385* (2013.01)

(58) Field of Classification Search
None
See application file for complete search history.

(56) References Cited

U.S. PATENT DOCUMENTS

| | | | |
|---|---|---|---|
| 6,813,528 B1 | 11/2004 | Yang | |
| 7,167,112 B2 | 1/2007 | Andersen et al. | |
| 7,187,947 B1 | 3/2007 | White et al. | |
| 7,293,122 B1 | 11/2007 | Schubert et al. | |
| 7,441,062 B2 | 10/2008 | Novotney et al. | |
| 7,673,020 B2 | 3/2010 | Rosenbloom et al. | |
| 2003/0162571 A1 | 8/2003 | Chung | |
| 2008/0068261 A1 | 3/2008 | Hempel | |
| 2008/0207232 A1 | 8/2008 | Rice et al. | |
| 2008/0274716 A1 | 11/2008 | Fok et al. | |
| 2010/0214211 A1* | 8/2010 | Dods et al. | 345/156 |
| 2010/0279825 A1* | 11/2010 | Riley | A63B 24/0006 482/8 |
| 2011/0252430 A1* | 10/2011 | Chapman et al. | 718/107 |
| 2012/0075529 A1* | 3/2012 | Wong et al. | 348/552 |

OTHER PUBLICATIONS

Krosche, Jens et al.; "Managing context on a sensor enabled mobile device—the mSense approach"; 2006, *IEEE International Conference on Wireless and Mobile Computing, Networking and Communications*, pp. 135-140.

* cited by examiner

*Primary Examiner* — Henry Tsai
*Assistant Examiner* — Aurangzeb Hassan
(74) *Attorney, Agent, or Firm* — Kilpatrick Townsend & Stockton, LLP (57) ABSTRACT

Sensor data is communicated between two electronic devices under control of the receiving device. For example, one device is equipped with one or more sensors that can produce a stream of real-time readings. The other device can request the sensor data from the first device and can also specify to the first device one or more throttling criteria to control or limit the amount of sensor data that is sent. Each throttling criterion can specify both a category of criterion (e.g., time-based, value-based, etc.) and a throttling parameter specific to the category. The first device can monitor the sensor data to determine when a throttling criterion specified by the second device is satisfied; when the throttling criterion is satisfied, the first device can send the current sensor reading as sensor data to the second device.

28 Claims, 6 Drawing Sheets

| COMMAND | DIRECTION | PAYLOAD |
|---|---|---|
| GetSensorNotify | A → M | n/a |
| RetSensorNotify | M → A | Available sensors |
| SetSensorNotify | A → M | Selected sensors |
| GetSensorThrottle | A → M | Sensor ID |
| RetSensorThrottle | M → A | Sensor ID, current throttle settings |
| SetSensorThrottle | A → M | Sensor ID, new throttle settings |
| GetThrottlingOptions | A → M | Sensor ID |
| RetThrottlingOptions | M → A | Sensor ID, options |
| SendSensorData | M → A | Sensor ID, data |
| GetSensorNow | A → M | Sensor ID |

COMMUNICATING SENSOR DATA BETWEEN ELECTRONIC DEVICES

CROSS-REFERENCE TO RELATED APPLICATIONS

This application claims the benefit of U.S. Provisional Application No. 61/388,465, filed Sep. 30, 2010, entitled "Communicating Sensor Data Between Electronic Devices," the disclosure of which is incorporated by reference herein in its entirety.

BACKGROUND

The present disclosure relates in general to communication between electronic devices and in particular to communicating sensor data between two electronic devices, such as a computing device and an accessory.

Mobile computing devices, including smart phones, personal digital assistants, and tablet computers, are rapidly becoming ubiquitous. Such devices often include sensors that provide information about the device or its surroundings, such as ambient light sensors, proximity sensors, accelerometers, magnetometers, and so on. These sensors can produce a continuous stream of data, which is typically sampled by a processor within the device and used in various ways. For example, data from an ambient light sensor can be used to automatically brighten or dim the device's display. Accelerometer data can be used to automatically rotate the display based on which edge is currently pointed up. Magnetometer data can be used to infer orientation of the device (e.g., a compass direction), and this information can be used in navigation or other applications.

Some mobile computing devices can also communicate with "accessory" devices, such as speakers and/or video systems that can receive video content from the mobile computing device, remote control devices, and the like. The mobile computing device can, for example, stream media content (e.g., audio and/or video) to the accessory or receive control signals from the accessory to control playback, communication, or other operations.

SUMMARY

Certain embodiments of the present invention provide techniques for communicating sensor data between two electronic devices, e.g., a mobile computing device (MCD) or other computing device and an accessory. In these embodiments, a first one of the devices (e.g., the MCD) can be equipped with one or more sensors (e.g., light sensor, proximity sensor, accelerometer) that can produce a stream of real-time readings. This sensor data may be of use in the operation of the second device (e.g., the accessory). The second device can request the sensor data from the first device and can also specify to the first device a throttling criterion to control or limit the amount of sensor data that is sent. The throttling criterion can specify both a "throttling category" (i.e., a type of condition to consider, such as time elapsed, magnitude of change in the reading, threshold conditions, or rate of change conditions) and a "throttling parameter" specific to the category (e.g., a specific time interval in the case of a time-based category, a specific magnitude in the case of a magnitude-based category, and so on). The first device can receive the request and the throttling criterion and initiate a process that monitors the sensor data to determine when the throttling criterion is satisfied; when the throttling criterion is satisfied, the first device can send the current sensor reading as sensor data to the second device.

The following detailed description together with the accompanying drawings will provide a better understanding of the nature and advantages of the present invention.

BRIEF DESCRIPTION OF THE DRAWINGS

FIGS. 2-5 are graphs of a sensor reading as a function of time for a sensor, illustrating categories of throttling criteria according to various embodiments of the present invention. In FIG. 2, the throttling category is based on a time interval.

In FIG. 3, the throttling category is based on a change in the sensor data.

In FIG. 4, the throttling category is based on a threshold applied to the sensor data.

In FIG. 5, the throttling category is based on a rate of change of the sensor data.

DETAILED DESCRIPTION

Certain embodiments of the present invention provide techniques for communicating sensor data between two electronic devices, e.g., a mobile computing device (MCD) or other computing device and an accessory. In these embodiments, a first one of the devices (e.g., the MCD) can be equipped with one or more sensors (e.g., light sensor, proximity sensor, accelerometer) that can produce a stream of real-time readings. This sensor data may be of use in the operation of the second device (e.g., the accessory). The second device can request the sensor data from the first device and can also specify to the first device a throttling criterion to control or limit the amount of sensor data that is sent. The throttling criterion can specify both a "throttling category" (i.e., a type of condition to consider, such as time elapsed, magnitude of change in the reading, threshold conditions, or rate of change conditions) and a "throttling parameter" specific to the category (e.g., a specific time interval in the case of a time-based category, a specific magnitude in the case of a magnitude-based category, and so on). The first device can receive the request and the throttling criterion and initiate a process that monitors the sensor data to determine when the throttling criterion is satisfied; when the throttling criterion is satisfied, the first device can send the current sensor reading as sensor data to the second device.

The example embodiments described below relate to a configuration in which a sensor is present in an MCD and the accessory requests sensor data; however, it is to be understood that the roles of the devices can be reversed, with a sensor being present in the accessory and sensor data being requested by the MCD, and that the techniques described herein can be applied equally to both situations. Further, while the example embodiments described below make specific reference to a mobile computing device, it is to be understood that other types of computing devices can be substituted and that embodiments of the present invention can be applied in connection with providing sensor data between any two electronic devices.

Figure 1:
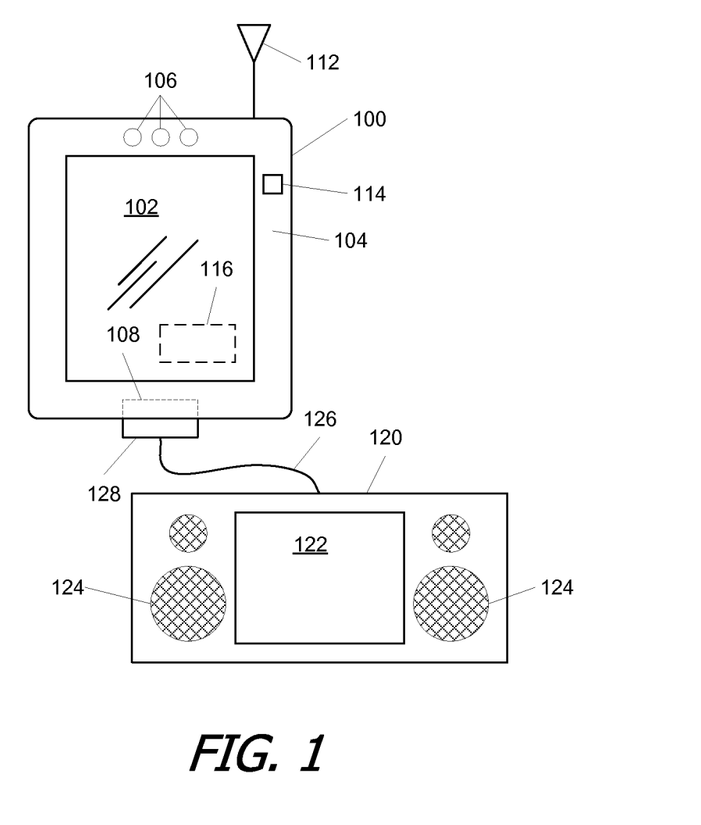
FIG. 1 is a front view of a mobile computing device connected to an accessory according to an embodiment of the present invention.

FIG. 1 is a front view of a mobile computing device (MCD) 100 connected to an accessory 120 according to an embodiment of the present invention. MCD 100 can have a touchscreen display 102 surrounded by bezel 104. Control buttons 106 provided in bezel 104 can be used, e.g., to wake MCD 100 from a hibernation state, to put MCD 100 into a hibernation state, or the like.

MCD 100 can have a connector 108 recessed into a bottom surface thereof, allowing MCD 100 to dock with an accessory device. Connector 108 can include a number of pins for carrying power, analog, and digital signals between MCD 100 and a connected accessory. In one embodiment, connector 108 can be implemented as a 30-pin docking connector as used in existing iPod® and iPhone® products sold by Apple Inc., assignee of the present application; in this embodiment, connector 108 is recessed into the housing of MCD 100 and is referred to as a "receptacle" connector. Other connectors can also be used.

MCD 100 can also have a wireless network interface, indicated by antenna 112, permitting access to a voice and/or data network. While antenna 112 is shown as external, it is to be understood that antenna 112 can be built into the housing of MCD 100. Any type of network access can be supported, and MCD 100 can provide wired network interfaces (e.g., Ethernet) in addition to or instead of a wireless interface.

MCD 100 can also have various sensors that respond to changes in conditions related to MCD 100. In some embodiments, an external sensor 114 can detect an external condition around MCD 100 and generate a signal indicative of the condition. Examples include an ambient light sensor that detects a light level around MCD 100 and generates a light-level signal, a proximity sensor that detects distance between a surface of MCD 100 and another surface and generates a proximity signal, a temperature sensor, a pressure sensor, a sound sensor (e.g., a microphone) or the like. In some embodiments, an internal sensor 116 can detect conditions within MCD 100 itself. Examples include an accelerometer and/or gyroscope that detects movement of MCD 100 and generates signals indicating direction of movement and/or orientation of MCD 100, a magnetometer that detects orientation of MCD 100 in a magnetic field (e.g., Earth's magnetic field, providing a compass) and generates corresponding signals, or the like. It is to be understood that any number and combination of sensors can be provided.

In the embodiment shown, MCD 100 can be a tablet computer with, e.g., a 10-inch screen. In other embodiments, MCD 100 can have a variety of form factors and configurations, e.g., smart phone, personal digital assistant, media player, portable web browser, etc.

Accessory 120 can be any accessory capable of interoperating with MCD 100. In the example shown, accessory 120 is a video dock that provides a display screen 122 and speakers 124. Accessory 120 can connect to MCD 100 via a cable 126. Cable 126 terminates in a connector 128 that mates with connector 108 of MCD 100. Cable 126 can incorporate various signal lines to provide transmission of control signals, audio signals, video signals, power and the like between MCD 100 and accessory 120. Thus, for example, MCD 100 can generate analog or digital video signals (including images and audio) and transmit the signals to accessory 120 via cable 126. In other embodiments, the connection can be wireless, e.g., using Wi-Fi or Bluetooth or the like. In some embodiments, accessory 120 may include a control panel (not shown) or remote control (also not shown) and can send control signals to MCD 100 in response to operation of the controls. Thus, a user can control operations of MCD 100 by interacting with accessory 120.

Accessory 120 can have any form factor desired. For example, a video dock may provide a significantly larger screen than MCD 100, allowing several users to watch a movie or the like together. In some embodiments, multiple accessories can be connected to MCD 100 at a given time. For example, while accessory 120 is connected via cable 126, another accessory can be connected wirelessly, or multiple accessories can be connected wirelessly to MCD 100, or MCD 100 can have multiple ports for wired connections; other configurations are also possible.

In some embodiments, it is desirable for accessory 120 to make use of sensor data collected by external sensor 114 and/or internal sensor 116 of MCD 100. As an example, it may be desirable to adjust the brightness of display 122 based on the ambient light level, in which case it would be desirable to provide information about the ambient light level to accessory 120; assuming external sensor 114 includes an ambient light sensor, accessory 120 can make use of the ambient light sensor data. As another example, accessory 120 may be capable of executing a program such as a navigation program that can benefit from having information as to the orientation (e.g., compass direction) in which it is currently pointed; assuming internal sensor 116 includes a magnetometer, accessory 120 can make use of the magnetometer data. The ability of accessory 120 to obtain sensor data from MCD 100 can, for example, reduce the cost of manufacturing accessory 120 (e.g., by eliminating the need to provide similar sensors in accessory 120) or provide more consistent behavior across different accessories interoperating with the same MCD.

In addition, even in cases where accessory 120 has its own sensors, it may still be useful for accessory 120 to obtain sensor data from MCD 100. For example, accessory 120 and MCD 100 can be in different places (cable 126 can be quite long, or wireless connections can be used) and thus experiencing different environmental conditions. Accessory 120 may be interested in the environmental conditions of MCD 100 (or vice versa).

Accordingly, in some embodiments of the present invention, the signals exchanged between MCD 100 and accessory 120 can include sensor data originating from any sensor of MCD 100 including external sensor 114 and internal sensor 116. In some embodiments, a sensor can provide updated data to MCD 100 on a substantially continuous basis (e.g., the interval between updates can be on the order of microseconds or shorter). However, providing sensor data updates to accessory 120 on a substantially continuous basis is not always necessary or desirable. For example, in some embodiments, frequent sensor data updates can consume a significant fraction (possibly even all) of the available bandwidth in a communication channel between MCD 100 and accessory 120, which can limit or slow (or block) other communication in that channel. In addition, in some embodiments, accessory 120 may have limited processing capability as compared to MCD 100, so even if the channel has sufficient bandwidth to transmit all the sensor data, accessory 120 might not have enough processing capability to process all of the data. Even if the communication channel has sufficient bandwidth and accessory 120 sufficient processing capability, accessory 120 might not need all of the sensor data in order to operate as desired, so that transmitting all the data, while possible, would be wasteful.

As these examples illustrate, rather than transmitting all available sensor data, it may be desirable to transmit only data that will actually be used by accessory 120, which may be a fraction of the data or data indicative of the occurrence of a particular event or change in condition.

Some embodiments of the present invention can provide a flexible framework for an accessory to obtain useful (i.e., actually or potentially useful to the accessory) sensor data from an MCD without receiving all sensor data. In some embodiments, accessory 120 can limit, or throttle, the rate at which MCD 100 sends sensor data by specifying a throttling criterion to be applied by MCD 100. The throttling criterion can include both a category, or type of condition to monitor, and a specific parameter value, e.g., a threshold, associated with the category. An accessory can select among a number of supported categories including time-based categories, value-based categories, rate-of-change based categories, and the like. By choosing appropriate throttling criteria based on its particular needs, accessory 120 can control the amount of sensor data received while ensuring that relevant data is received.

Examples of throttling categories and associated parameters are illustrated in FIGS. 2-5, which show graphs of a sensor reading (line 200) as a function of time for a sensor. For example, in the embodiment of FIG. 1, external sensor 114 can be an ambient light sensor, and the pattern of sensor readings indicated by line 200 might occur, e.g., if MCD 100 is used outdoors on a partly cloudy day. Also indicated (by circles) are sensor readings that can be sent to an accessory in response to satisfaction of various throttling criteria according to embodiments of the present invention. In each of these examples, the same pattern of sensor readings is shown as curve 200, illustrating that different throttling criteria can have different effects on the number and timing of sensor updates sent to an accessory.

Figure 2:
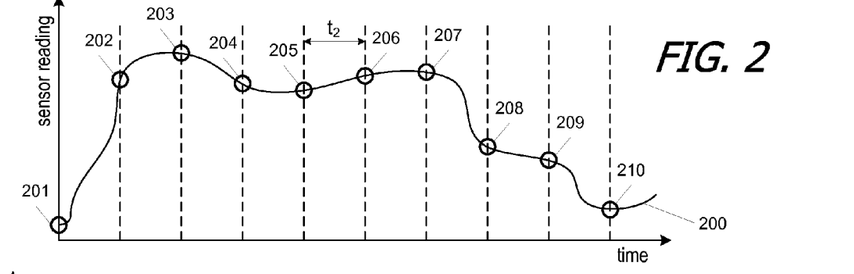

FIG. 2 illustrates an embodiment where the accessory specifies a throttling category indicating that sensor data should be sent at regular time intervals and a throttling parameter defining the particular interval, e.g., every $t_2$ microseconds. (The time interval is indicated in FIG. 2 by vertical broken lines.) The sensor readings that are reported to the accessory and the times at which these readings are reported are indicated by circles 201-210. Sending data at regular intervals is an example of a time-based throttling category. In some embodiments, the interval $t_2$ can be specified by the accessory as a throttling parameter specific to the "regular time intervals" throttling category.

Figure 3:
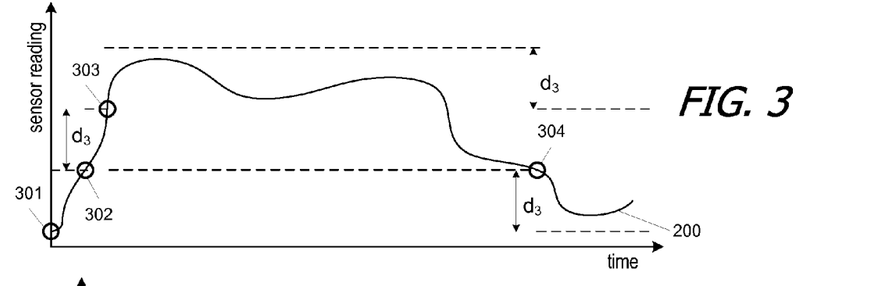

FIG. 3 illustrates an embodiment where the accessory specifies a throttling category indicating that sensor data should be sent when the data value changes by a specific magnitude and a throttling parameter defining the magnitude, e.g., $d_3$ units. (The magnitude of change in data value is indicated in FIG. 3 by horizontal broken lines.) The sensor readings that are reported to the accessory and the times at which these readings are reported are indicated by circles 301-304. In this example, an initial reading (circle 301) is reported to provide a baseline. Subsequent sensor readings are not reported at regular time intervals; instead, they are reported whenever the sensor reading changes (upward or downward) by $d_3$ units relative to the previous reported reading. (The broken horizontal lines indicate the sensor readings at which a report would be triggered at any given time.) Thus, for example, reported readings 301-303 are much closer in time to each other than to reading 304. This is an example of a value-based throttling category. In some embodiments, the interval $d_3$ can be specified by the accessory as a throttling parameter specific to the "magnitude of change" throttling category.

Figure 4:
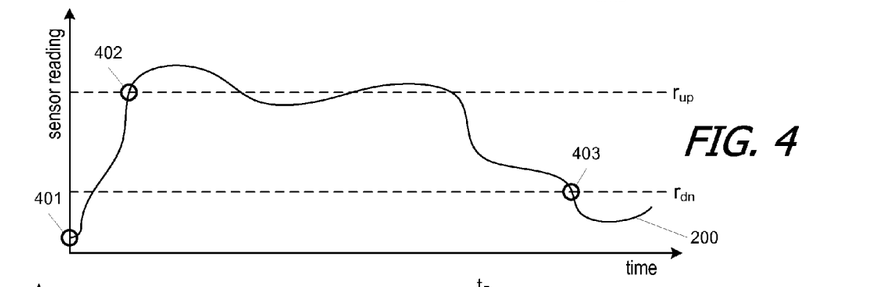

FIG. 4 illustrates an embodiment where the accessory specifies a throttling category indicating that sensor data should be sent when the data value crosses a threshold and two throttling parameters defining thresholds, $r_{up}$ and $r_{dn}$. In this example, sensor readings are sent at an initial time (circle 401) and thereafter only when the sensor reading crosses threshold $r_{up}$ in an increasing direction (e.g., at circle 402) or threshold $r_{dn}$ in a decreasing direction (e.g., at circle 403). In this example, once one threshold is crossed in the applicable direction and a report is sent, no further report is sent until the other threshold is crossed; thus, for example, the repeated crossings of the $r_{up}$ threshold in FIG. 4 do not trigger additional readings. This rule creates a hysteresis effect that can further reduce the amount of sensor data that is sent. The embodiment of FIG. 4 is another example of a value-based throttling category, in this case based on threshold crossing. While the example shows different thresholds applying to upward and downward transitions, in some embodiments a single threshold can be used for transitions in both directions. In some embodiments, the thresholds $r_{up}$ and $r_{dn}$, can be specified by the accessory as throttling parameters specific to the "threshold crossing" throttling category.

Figure 5:
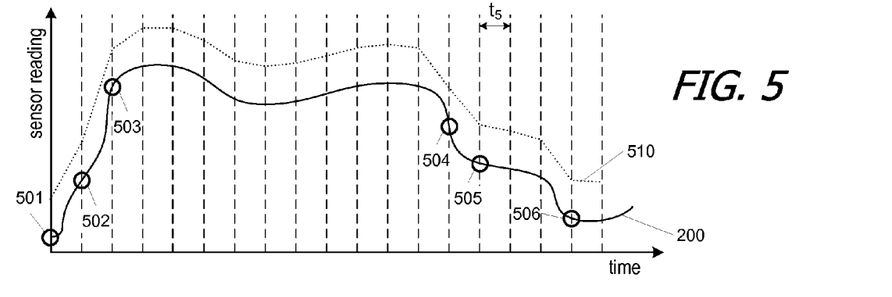

FIG. 5 illustrates an embodiment where the accessory specifies a throttling category indicating that sensor data should be sent when the average rate of change in the sensor data during some time interval exceeds a minimum value. The time interval and/or the minimum value can be specified as throttling parameters. In the example shown, the time interval is $t_5$ (intervals are marked by broken lines in FIG. 5). The sensor reading is sampled every $t_5$ seconds; it is to be understood that $t_5$ can be orders of magnitude less than 1, and the sampling rate can be on the order of milliseconds or microseconds. For each time interval, a slope, or average rate of change, can be calculated as $m=(r_f-r_i)/t_5$, where $r_i$ and $r_f$ are, respectively, the initial and final sensor readings in the interval. The final reading $r_f$ is reported to the accessory if $|m|$ (absolute value of the slope m) exceeds a threshold $m_5$. Dotted line 510 illustrates the slopes between initial and final readings in each time interval; line 510 has been offset from line 200 for clarity without affecting the slopes. Thus, as indicated by circles 501-505, sensor data is more likely to be sent during periods of rapid change (e.g., the time between circles 501 and 503) but not while the sensor reading is relatively stable as in the time between circles 503 and 504. In this example, the threshold $m_5$ is based on $|m|$, so the same threshold applies for both increasing and decreasing slope; in other embodiments, thresholds for increasing and decreasing slope can be specified independently. In some embodiments, the threshold $m_5$ and/or time interval $t_5$ can be specified by the accessory as parameters specific to the "rate of change" category. (In some embodiments, $t_5$ can be determined by the MCD, e.g., based on how frequently it polls a particular sensor.) Those skilled in the art will appreciate that where $t_5$ is constant, a threshold can be specified on the difference $r_f-r_i$ rather than on the slope, with the same result.

It will be appreciated that the throttling categories described herein are illustrative and that variations and modifications are possible. Throttling categories can be based on regular time intervals, the magnitude or change in magnitude of the sensor reading, or combinations thereof (e.g., rate of change). In the case of throttling criteria based on changes in sensor readings during a fixed time interval, the change can be measured within overlapping or nonoverlapping time intervals as desired. More complex throttling criteria can be used by combining criteria from different categories. For example, in the case of throttling criteria based on magnitude or rate of change of sensor data (e.g., as shown in FIGS. 3-5), the time between sensor updates can become quite large. In some embodiments, an accessory can specify that an update should be sent if either the magnitude or rate of change meets a particular criterion or the time since the last update exceeds a threshold. Using a maximum-time criterion in combination with another throttling criterion can provide a heartbeat-type indication to the accessory that the MCD is continuing to monitor and communicate sensor data while also providing information about significant (from the accessory's perspective) changes as they happen.

In some embodiments, a throttling criterion can be based on readings of multiple sensors. For example, the criterion can be based on comparing readings from two (or more) similar sensors (e.g., a gyroscope and an accelerometer, both of which can measure rotation). In some embodiments, data is sent if the difference between the two sensor readings exceeds a threshold. In other embodiments data is sent if the difference is less than a threshold, or if the difference is zero (within applicable tolerances). As another example, a criterion can be based on a conjunction of readings from different sensors, e.g., whether each of two (or more) sensors is above some threshold, below some threshold, changing rapidly, etc. As yet another example, a throttling criterion based on one sensor can be used to control when data from another sensor is sent. For example, both accelerometer and gyroscope data can be sent when the accelerometer data changes by a minimum amount.

The throttling criteria described above can be applied to various types of sensor data that can be provided by one device to another. While the examples are described in terms of an MCD sending data based on throttling criteria specified by an accessory, it will be recognized that similar techniques can be applied to allow an accessory to send sensor data based on throttling criteria specified by an MCD or more generally to allow a first electronic device to send sensor data based on throttling criteria specified by a second electronic device.

Throttling criteria can be applied to raw sensor data (i.e., data received by the MCD) or to sensor data after processing by the MCD. For example, in the case of an MCD with GPS capability, the MCD can include a GPS sensor that receives signals from various orbiting satellites and a processor (e.g., a dedicated GPS signal processor or code executed in a primary processor) that computes a location (e.g., latitude and longitude) based on the received signals. In some embodiments, throttling of GPS data can be based on a change in the computed location rather than directly on changes in the received signals. Thus, for example, GPS sensor notifications can be throttled based on whether the location has changed by some desired distance (e.g., 50 feet or 50 miles), rather than based on changes in received satellite signals.

Figure 6:
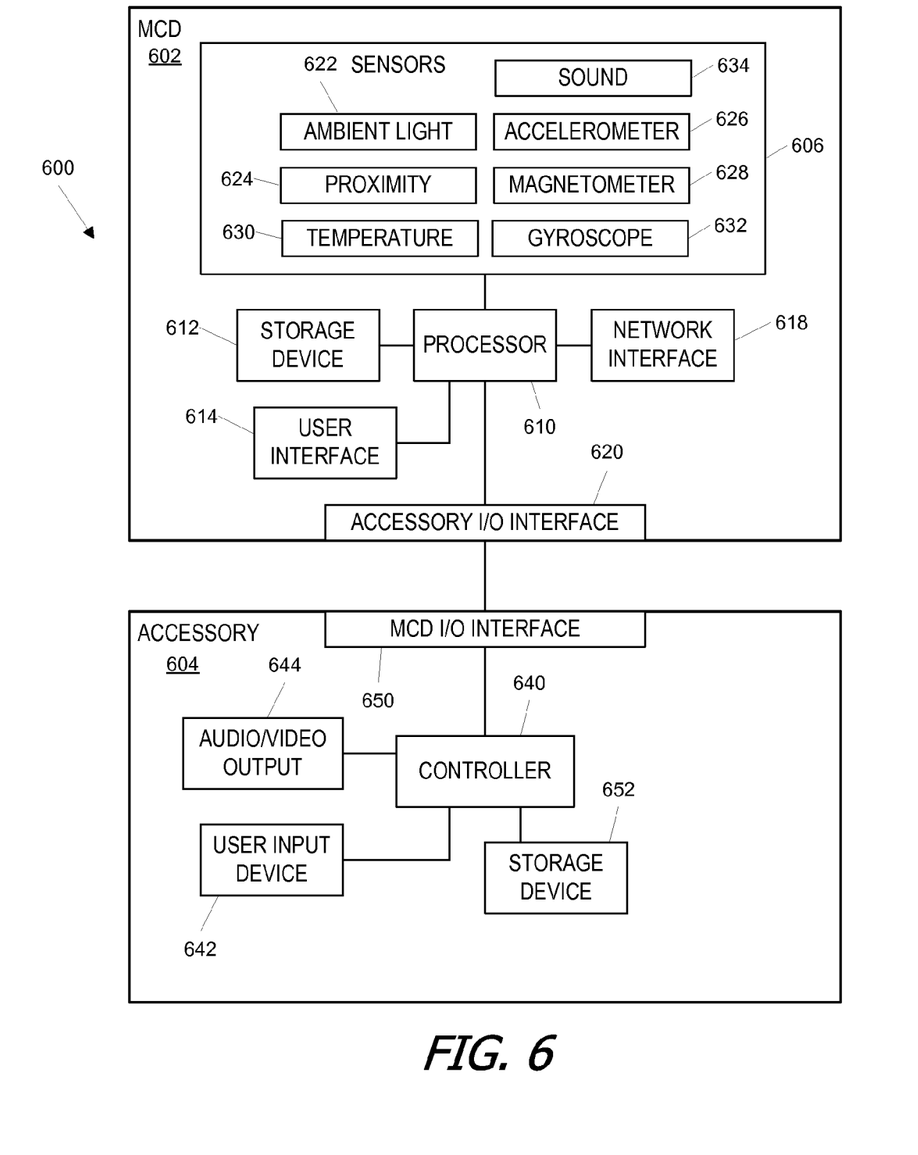
FIG. 6 is a simplified block diagram of a system including a mobile computing device and an accessory according to an embodiment of the present invention.

FIG. 6 is a simplified block diagram of a system 600 including MCD 602 and accessory 604 according to an embodiment of the present invention. In this embodiment, MCD 602 (e.g., implementing MCD 100 of FIG. 1) can provide computing, communication and/or media playback capability. MCD 602 can include sensors 606, processor 610, storage device 612, user interface 614, network interface 618, and accessory input/output (I/O) interface 620. MCD 602 can also include other components (not explicitly shown) to provide various enhanced capabilities.

Sensors 606 can include various electronic, mechanical, electromechanical, optical, or other devices that provide information related to external conditions around MCD 602. Shown by way of example are an ambient light sensor 622, a proximity sensor 624, an accelerometer 626, a magnetometer 628, a temperature sensor 630, a gyroscope 632, and a sound sensor 634. Ambient light sensor 622 can sense an ambient light level; for example, sensor 622 can include a photosensitive element on the housing of MCD 602 and associated electronics to convert sensed light to an analog or digital electrical signal. Proximity sensor 624 can sense distance between a surface of MCD 602 and another object; for example, sensor 624 can include an electromagnetic emitter (e.g., infrared) and detectors and signal analyzers for the return signal and/or a capacitive sensor, along with associated electronics to produce an analog or digital electrical signal corresponding to the nearness of the object.

Accelerometer 626 can sense acceleration (relative to freefall) along one or more axes, e.g., using piezoelectric or other components in conjunction with associated electronics to produce a signal. Magnetometer 628 can sense an ambient magnetic field (e.g., Earth's magnetic field) and generate a corresponding electrical signal. Sensors 606 in some embodiments can provide digital signals to processor 610, e.g., on a streaming basis or in response to polling by processor 610 as desired. Temperature sensor 630 can sense a temperature, either internal or external to MCD 602; thermocouples, thermistors, semiconductor temperature sensors, radiative sensors, or the like can be used. Gyroscope 632 can sense rotational motion in one or more directions, e.g., using one or more MEMS (micro-electro-mechanical systems) gyroscopes and related control and sensing circuitry. Sound sensor 634 can be, e.g., a microphone with associated electronics that can determine, e.g., a decibel level.

Other sensors can also be included in addition to or instead of these examples. For example, MCD 602 can include a Global Positioning System (GPS) receiver that determines location based on signals received from GPS satellites. A particular sensor, combination of sensors, or sensor implementation is not critical to the present invention, and conventional sensors can be used.

Storage device 612 can be implemented, e.g., using disk, flash memory, or any other non-volatile storage medium. In some embodiments, storage device 612 can store media assets such as audio, video, still images, or the like, that can be played by MCD 602. Storage device 612 can also store other information such as a user's contacts (names, addresses, phone numbers, etc.); scheduled appointments and events; notes; and/or other personal information. In some embodiments, storage device 612 can store one or more application programs to be executed by processor 610 (e.g., video game programs, personal information management programs, media playback programs, etc.).

User interface 614 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 614 to invoke the functionality of MCD 602 and can view and/or hear output from MCD 602 via output devices of user interface 614.

Processor 610, which can be implemented as one or more integrated circuits (e.g., a conventional microprocessor or microcontroller), can control the operation of MCD 602. In various embodiments, processor 604 can execute a variety of programs in response to program code and can maintain multiple concurrently executing programs or processes. At any given time, some or all of the program code to be executed can be resident in processor 610 and/or in storage media such as storage device 612.

Through suitable programming, processor 610 can provide various functionality for MCD 602. For example, in response to user input signals provided by user interface 614, processor 610 can operate a database engine to navigate a database of media assets stored in storage device 612 in response to user input and display lists of selected assets. Processor 610 can respond to user selection of an asset (or assets) to be played by transferring asset information to a playback engine also operated by processor 610, thus allowing media content to be played. Processor 610 can also operate other programs to control other functions of MCD 602. In some embodiments, processor 610 can execute a program to control obtaining of sensor data from sensors 606 and delivery of sensor data to a connected accessory 604. Such a program can implement throttling behavior as described herein.

Network interface 618 can provide voice and/or data communication capability for MCD 602. In some embodiments network interface 618 can include radio frequency (RF) transceiver components for accessing wireless voice and/or data networks (e.g., using cellular telephone technology, advanced data network technology such as 3G, 4G, EDGE, Wi-Fi (IEEE 802.11 family standards), or other mobile communication technologies, or any combination thereof), GPS receiver components, and/or other components. In some embodiments network interface 618 can provide wired network connectivity (e.g., Ethernet) in addition to or instead of a wireless interface. Network interface 618 can be implemented using a combination of hardware (e.g., antennas, modulators/demodulators, encoders/decoders, and other analog and/or digital signal processing circuits) and software components.

Accessory I/O interface 620 can allow MCD 602 to communicate with various accessories. For example, accessory I/O interface 620 can support connections to a computer, an external speaker or media playback station (e.g., video dock accessory 120 of FIG. 1), a digital camera, a radio tuner (e.g., FM, AM and/or satellite), an in-vehicle entertainment system, an external video device, card reader, disc reader, or the like.

In some embodiments, accessory I/O interface 620 can include a connector, such as a 30-pin connector corresponding to the connector used on iPod® and iPhone® products, as well as supporting circuitry. The connector can provide connections for power and ground as well as for various wired communication interfaces such as Universal Serial Bus (USB), FireWire (IEEE 1394 standard), and/or universal asynchronous receiver/transmitter (UART). The connector can also provide connections for audio and/or video signals, which may be transmitted to or from MCD 602 in analog and/or digital formats. Thus, accessory I/O interface 620 can support multiple communication channels, and a given accessory can use any or all of these channels.

In some embodiments, accessory I/O interface 620 can include a wireless interface. For example, a Wi-Fi interface and/or a Bluetooth interface (a short-range wireless interface complying with Bluetooth specifications promulgated by Bluetooth SIG, Inc.). Infrared, ultrasonic, and/or other wireless interfaces can also be used.

In some embodiments, MCD 602 can communicate with multiple accessories concurrently. For example, multiple accessory I/O interfaces 620 can be provided, including any combination of wired and/or wireless interfaces. In some embodiments, multiple accessories can communicate with MCD 602 via the same accessory I/O interface 620.

Accessory 604 (e.g., implementing accessory 120 of FIG. 1) can include controller 640, user input device 642, audio/video output device 644, MCD I/O interface 650, and storage device 652. Accessory 604 is representative of a broad range of accessories that can have their own functionality and be connected to MCD 602. Accessories can vary widely in capability, complexity, and form factor. Various accessories may include components not shown in FIG. 6, including but not limited to storage devices (disk, flash memory, etc.) with fixed or removable storage media; camera components such as lenses, image sensors, and controls for same (e.g., aperture, zoom, exposure time, frame rate, etc.); microphones for recording audio (either alone or in connection with video recording); and so on.

Controller 640 can include, e.g., a microprocessor or microcontroller executing program code to perform various operations associated with accessory 604. For example, where accessory 604 incorporates a sound and/or video system (e.g., as shown in FIG. 1), program code executed by controller 640 can include programs for digital audio decoding, analog or digital audio processing, and the like. Where accessory 604 incorporates a digital camera, program code executed by controller 640 can include programs that allow a user to control the camera to adjust settings, capture images, display images, transfer image data to another electronic apparatus, etc.

User input device 642 may include user-operable controls such as a touch pad, touch screen, scroll wheel, click wheel, dial, button, switch, keyboard, keypad, microphone, or the like. A user can operate the various input controls of user interface 634 to invoke functionality of accessory 604, and such functionality may include exchanging control signals, data, or other communications with MCD 602.

In some embodiments, accessory 604 can also provide output devices such as audio/video output device 644. In some embodiments, audio/video output device 644 can include speakers and/or connection ports for connecting external speakers or headphones; a video screen and/or a connection port for connecting an external video screen, indicator lights, or the like, together with supporting electronics (e.g., digital-to-analog or analog-to-digital converters, signal processors or the like). These components can be coupled to receive audio and/or video signals via MCD I/O interface 650. Such components can allow the user to view and/or hear output from accessory 604.

Storage device 652 can be implemented, e.g., using disk, flash memory, or any other non-volatile storage medium. In some embodiments, storage device 652 can store program code and/or control information for controller 640.

MCD I/O interface 650 can allow accessory 604 to communicate with MCD 602 (or another MCD). For example, MCD I/O interface 626 can provide a standard, mini, or micro USB port. In other embodiments, MCD I/O interface 626 can include a connector that can mate directly with a connector included in MCD 602, such as a 30-pin connector that mates with the connector used on various iPod® products. Such a connector can be used to supply power to MCD 602 or receive power from MCD 602, to receive audio and/or video signals in analog and/or digital formats, and to communicate information via various interfaces such as USB, UART, and/or FireWire.

Accessory 604 can be any electronic apparatus that interacts with MCD 602. In some embodiments, accessory 604 can provide remote control over operations of MCD 602, or a remote user interface that can include both input and output controls (e.g., a display screen). Accessory 604 in various embodiments can control any function of MCD 602 and can also receive media content from MCD 602 and present such content to the user (e.g., through audio speakers and/or a video display screen, depending on the type of media content). In other embodiments, MCD 602 can control operations of accessory 604, such as retrieving stored data from a storage medium of accessory 604, initiating an image capture operation by a camera incorporated into accessory 604, etc.

In accordance with embodiments of the present invention, accessory 604 can request and receive sensor data from MCD 602 via accessory I/O interface 620 and MCD I/O interface 650. In some embodiments, controller 640 can determine conditions under which receiving updated sensor data is desirable and communicate corresponding throttling criteria to MCD 602.

It will be appreciated that the system configurations and components described herein are illustrative and that variations and modifications are possible. The MCD and/or accessory may have other capabilities not specifically described herein (e.g., mobile phone, global positioning system (GPS), broadband data communication, Internet connectivity, etc.).

While sensors 606 in FIG. 6 are depicted as being located in MCD 602, with accessory 604 able to receive sensor data from MCD 602 via interfaces 620 and 650, it will be appreciated that interfaces 620 and 650 can allow data transfer in the other direction as well. Accordingly, in some embodiments sensors such as sensors 606 can be present in accessory 604, with MCD 602 receiving sensor data via interfaces 620 and 650.

Connectors at the MCD and accessory interfaces can be complementary or not as desired. Where two connectors are not complementary, an adapter can be provided to connect the two devices. While connectors may be described herein as having pins, a term generally associated with conventional electronic devices having wires to connect components, it is to be understood that other signal paths (e.g., optical signaling) can be substituted. Further, in some embodiments, some of the connections can be wireless, and connectors can be omitted where wireless interfaces are provided.

Further, while the MCD and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Accessory I/O interface 620 of MCD 602 and MCD I/O interface 650 of accessory 604 allow MCD 602 to be connected with accessory 604 and subsequently disconnected from accessory 604. As used herein, an MCD and an accessory are "connected" whenever a communication channel is established between their respective mating interfaces and "disconnected" when the channel is terminated. Such connection can be achieved via direct physical connection, e.g., with mating connectors; indirect physical connection, e.g., via a cable; and/or wireless connection, e.g., via Bluetooth.

In some embodiments, an MCD and an accessory can communicate while connected by exchanging commands and data according to an MCD accessory protocol, also referred to herein as an "accessory protocol." The commands and data can be communicated, e.g., using any wired or wireless transport medium provided by the relevant interfaces.

The accessory protocol defines a format for messages to be exchanged between MCD 602 and any accessories connected thereto. For instance, the accessory protocol may specify that each message (also referred to herein as a command) is sent in a packet with a header and an optional payload. The header provides basic information (e.g., a start indicator, length of the packet, and a command code identifying a command to be processed by the recipient), while the payload provides any data associated with the command; the amount of associated data can be different for different commands, and some commands may provide for variable-length payloads. In some embodiments, the commands may be defined such that any particular command code is valid in only one direction. The packet can also include error-detection or error-correction codes as known in the art.

The accessory protocol can define a number of "lingoes," where a "lingo" is a group of related commands that can be supported (or unsupported) by various classes of accessories. In one embodiment, a command code can include a first byte identifying the lingo to which the command belongs and a second byte identifying the particular command within the lingo. Other command structures may also be used. It is not required that all accessories, or all MCDs to which an accessory can be connected, support every lingo defined within the accessory protocol.

In some embodiments, every accessory (including accessories 602, 604) and every MCD 602 that use the accessory protocol support at least a "general" lingo that includes commands common to the MCD and all accessories. The general lingo can include commands enabling the MCD and the accessory to identify and authenticate themselves to each other and to provide general information about their respective capabilities, including which (if any) other lingoes each supports. The general lingo can also include authentication commands that the MCD can use to verify the purported identity and capabilities of the accessory (or vice versa), and the accessory (or MCD) may be blocked from invoking certain (or all) commands or lingoes if the authentication is unsuccessful. For example, an MCD can be configured to send sensor data to an accessory only after the accessory has been successfully authenticated.

An MCD accessory protocol can also include various other lingoes, such as a simple remote lingo that allows an accessory to send a command indicating a function of the MCD to be invoked, a remote user interface lingo that can be used to communicate commands and data related to replicating all or part of a user interface of an MCD on an accessory (thereby supporting a more advanced remote control), a tuner lingo that allows a user to control a tuner accessory by operating the MCD and/or to control a tuner in the MCD by operating an accessory, a storage lingo that allows an accessory to store data on the MCD, and so on. Any lingo or combination of lingoes or other commands or groups of commands can be used in connection with an accessory protocol.

In some embodiments, the MCD accessory protocol can include commands related to communication of sensor data. Where the MCD accessory protocol includes multiple lingoes, such commands can be part of a general lingo, a sensor lingo, or a sensor-specific lingo associated with a particular sensor.

Figure 7:
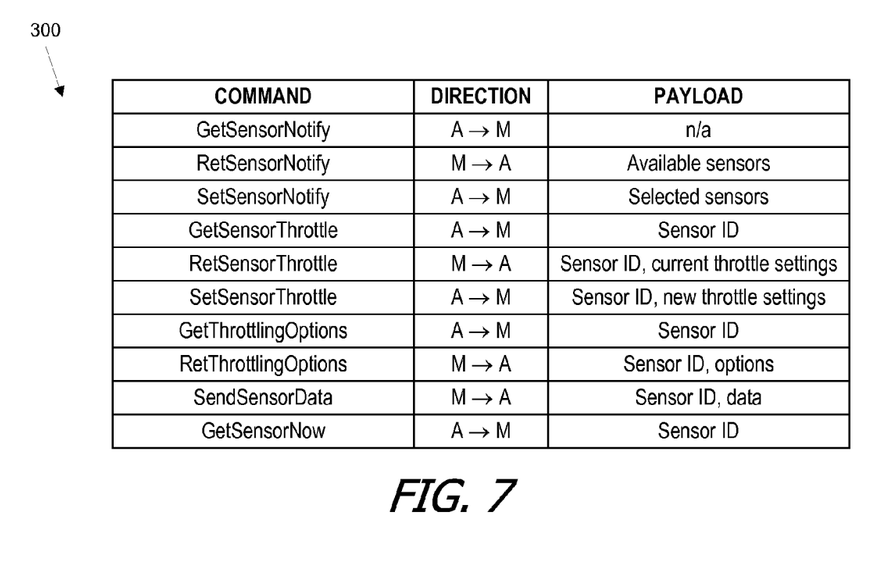
FIG. 7 is a table illustrating commands that can be used to communicate sensor data from a mobile computing device to an accessory according to an embodiment of the present invention.

FIG. 7 is a table 700 illustrating commands that can be used to communicate sensor data from an MCD to an accessory according to an embodiment of the present invention. In table 700, each command has a direction (either from accessory ("A") to MCD ("M") or vice versa), and a payload, if applicable, is shown. In this example, the same commands are applicable to all sensors, with a sensor identifier ("sensor ID") included in the payload where the command is specific to a particular sensor. These commands will now be described.

A GetSensorNotify command can be sent by the accessory to the MCD to request information as to what types of sensor data the MCD can provide to the accessory. This command need not have a payload.

A RetSensorNotify command can be sent by the MCD to the accessory to provide information as to available sensor data, e.g., in response to the GetSensorNotify command. In one embodiment, the payload can be a list of sensors for which MCD can transfer data. Each sensor can be identified by a unique identifier (e.g., a number), and the sensor type for that sensor can be indicated, e.g., using a text string or a coded sensor-type identifier (e.g., type 1=magnetometer, type 2=accelerometer, etc.). In some embodiments, the RetSensorNotify command can also include additional information about each sensor, e.g., its range, precision, unthrottled data rate, or other characteristics.

A SetSensorNotify command can be sent by the accessory to the MCD to request sensor data for specific sensors. In some embodiments, the payload can include a list of the sensor identifiers for the sensors for which sensor data is requested; any sensors not listed are assumed to be unrequested. In other embodiments, a bitmask can be used, with different bits mapped to different available sensors and each bit being set or cleared to indicate whether sensor data for the corresponding sensor is desired. In some embodiments, the accessory can send a SetSensorNotify command at any time to change the set of sensors for which data is requested.

A GetSensorThrottle command can be sent by the accessory to the MCD to request the current throttling criterion for a particular sensor. The payload can include an identifier of the sensor for which throttling information is requested. In some embodiments, the GetSensorThrottle command can be sent for a particular sensor regardless of whether data from that sensor is currently requested or not.

A RetSensorThrottle command can be sent by MCD to the accessory to provide the current throttling criterion for a sensor, e.g., in response to the GetSensorThrottle command. In some embodiments, the payload includes the throttling criterion, which can be specified by reference to a throttling category and one or more category-specific throttling parameters (e.g., as described above with reference to FIGS. 2-5). If multiple throttling criteria are concurrently established for a particular sensor, the RetSensorThrottle command can provide all such criteria. In some embodiments, sensor data is unthrottled by default, and the payload of the RetSensorThrottle command can indicate that no throttling criterion has been established. In other embodiments, a default throttling criterion (e.g., send data every 100 ms) can be applied where the accessory has not established any other throttling criterion.

A SetSensorThrottle command can be sent by the accessory to the MCD to set or change a throttling criterion for a sensor. In some embodiments, the payload includes the throttling criterion, which can be specified by reference to a throttling category and one or more category-specific throttling parameters (e.g., as described above with reference to FIGS. 2-5). If multiple throttling criteria are to be concurrently established for a particular sensor, the SetSensorThrottle command can provide all such criteria. In some embodiments, the criteria specified in the SetSensorThrottle command supersede any previously established throttling criteria.

A GetThrottlingOptions command can be sent by the accessory to the MCD to request the available throttling options for a particular sensor; the particular sensor can be specified by including its sensor ID in the payload. In some embodiments, any throttling category can be applied to any sensor; in other embodiments, some sensors may be restricted to particular throttling categories, and the GetThrottlingOptions command can be used to inquire as to the supported throttling categories for a particular sensor. The throttling options may also provide other information such as a valid range of throttling parameters for a given throttling category.

A RetThrottlingOptions command can be sent by the MCD to the accessory in response to a GetThrottlingOptions command. The payload can include the sensor ID for the sensor whose options are being returned and additional data indicating the options. For example, a bit mask can be used to indicate which throttling categories are applicable. Other information (e.g., a valid range of parameters for a particular combination of sensor and throttling category) can also be provided via the RetThrottlingOptions command.

A SendSensorData command can be sent by the MCD to the accessory to provide sensor data. The payload can include the sensor ID and associated data (e.g., current sensor reading). In some embodiments, the MCD sends the SendSensorData command when the data has been requested (e.g., using the SetSensorNotify command) and a throttling criterion (e.g., as established using the SetSensorThrottle command) is met. The SendSensorData command can also be sent once in response to a SetSensorNotify command to provide the accessory with an initial sensor data value, regardless of whether the throttling criterion is satisfied at that point in time. The MCD can continue to send SendSensorData commands at any point where the applicable throttling criterion is satisfied.

A GetSensorNow command can be sent by the accessory to the MCD to request a single sensor reading. The payload can include the sensor ID. The MCD can respond with a SendSensorData command providing the current reading of the identified sensor; this response can be sent regardless of whether any throttling criterion has been met or whether the accessory previously registered for updates from the identified sensor, e.g., using the SetSensorNotify command described above. In some embodiments, each GetSensorNow command that is sent results in one data response; thus this command can be used by an accessory to poll a sensor of the MCD at times or time intervals determined by the accessory.

It will be appreciated that the commands described herein are illustrative and that variations and modifications are possible. Other commands or command sequences can be used to communicate sensor information between an MCD and an accessory. For example, in some embodiments, the MCD can provide information about its sensors as part of an identification process that occurs automatically when the MCD and accessory become connected; thus, the accessory need not specifically request this information. In addition, while the commands shown in FIG. 7 provide communication of sensor data from an MCD to an accessory, similar commands can be implemented to provide communication of sensor data from an accessory to an MCD.

Figure 8:
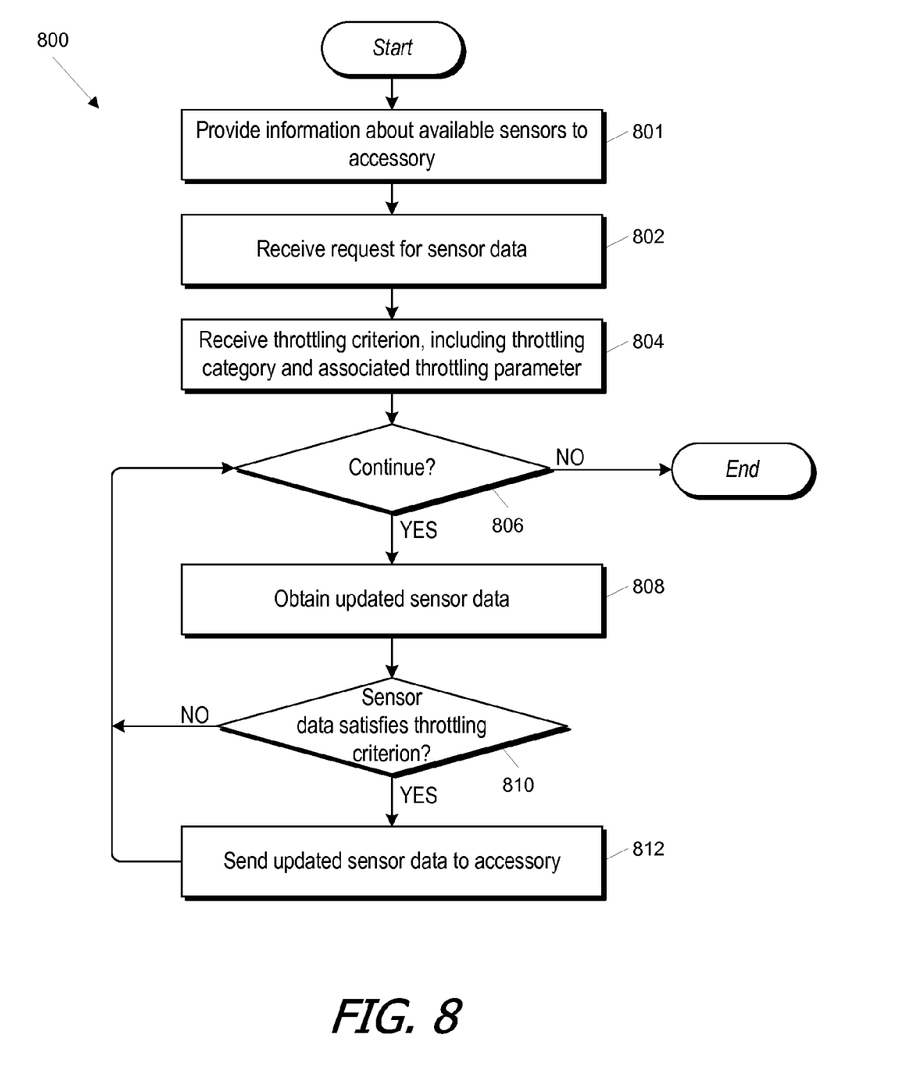
FIG. 8 is a flow diagram of a process that can be used by a mobile computing device to send sensor data to an accessory according to an embodiment of the present invention.

FIG. 8 is a flow diagram of a process 800 that can be used by an MCD (e.g., MCD 602 of FIG. 6) to send sensor data to an accessory (e.g., accessory 604 of FIG. 6) according to an embodiment of the present invention. Process 800 starts when an MCD and an accessory are connected. At block 801, MCD 602 can provide information about available sensors to the accessory. For example, MCD 602 can receive a GetSensorNotify command from accessory 604 and send a RetSensorNotify command in response. At block 802, MCD 602 receives a request for sensor data from accessory 604. For example, MCD 602 can receive a SetSensorNotify command identifying a particular sensor for which data is requested. In some embodiments, MCD 602 can send an initial SendSensorData command in response to the SetSensorNotify command, providing the current sensor data.

At block 804, MCD 602 can receive a throttling criterion defined by the accessory. As described above, the throttling criterion can be provided to the MCD using a SetSensorThrottle command, and the throttling criterion can specify a throttling category (e.g., a time interval category as shown in FIG. 2, a magnitude-of-change category as shown in FIG. 3, a threshold-crossing category as shown in FIG. 4, or a rate-of-change category as shown in FIG. 5) and a throttling parameter associated with the category (e.g., a time interval t2 for the time interval category, a change amount d3 for the magnitude-of-change category, thresholds $r_{up}$ and/or $r_{dn}$, for the threshold-crossing category, or a minimum rate of change for the rate-of-change category).

At block 806, MCD 602 can determine whether process 800 should continue; in some embodiments, process 800 can continue until accessory 604 instructs MCD 602 to stop sending sensor data (e.g., using a SetSensorNotify command specifying that data should not be sent for any sensor) or until accessory 604 becomes disconnected, at which point process 800 can end. In some embodiments, block 806 can also include determining whether accessory 604 has changed the selection of sensors for which data should be sent (e.g., whether another SetSensorNotify command has been received) and/or the throttling criteria for a selected sensor (e.g., whether a new SetSensorThrottle command has been received). If the selected sensors or throttling criteria are changed, process 800 can return to block 804 to update the throttling criteria accordingly.

At block 808, MCD 602 can obtain updated sensor data for the requested sensor. In some embodiments, each sensor 606 (in FIG. 6) provides data periodically to processor 610; in other embodiments, processor 610 can poll any of sensors 606 to obtain its data, e.g., at regular intervals.

At block 810, MCD 602 can determine whether the sensor data satisfies the throttling criterion. For example, in the case of a time-interval criterion with time interval $t_2$, MCD 602 can track when the last sensor data was sent and determine whether time $t_2$ has elapsed since then. (In some embodiments where processor 610 polls sensors 606, processor 610 can simply poll the selected sensor at intervals corresponding to $t_2$, in which case all obtained sensor data would satisfy the criterion. Other implementations are possible.) In the case of a magnitude-of-change or threshold-crossing criteria, the current data obtained at block 808 can be compared to previously obtained sensor data (e.g., from a previous pass through block 808). In some embodiments, if no sensor data has previously been reported, the updated data obtained at block 808 is treated as satisfying the throttling criterion.

If the throttling criterion is satisfied, then at block 812, MCD 602 can send updated sensor data to accessory 604. Regardless of whether data is sent, process 800 can return to block 806; thus, process 800 can continue for as long as desired to obtain updated sensor data and report the updated data if the throttling criterion is satisfied.

If multiple sensors are available, process 800 can be used for each sensor. Where accessory 604 has made concurrent requests for data from multiple sensors, obtaining sensor data and determining whether the throttling criterion is satisfied can be performed independently for each sensor. The updated sensor data can be selectively sent for those sensors that satisfied the appropriate throttling criterion. It should be understood that different throttling criteria can be applied to different sensors (e.g., by using multiple SetSensorThrottle commands).

Figure 9:
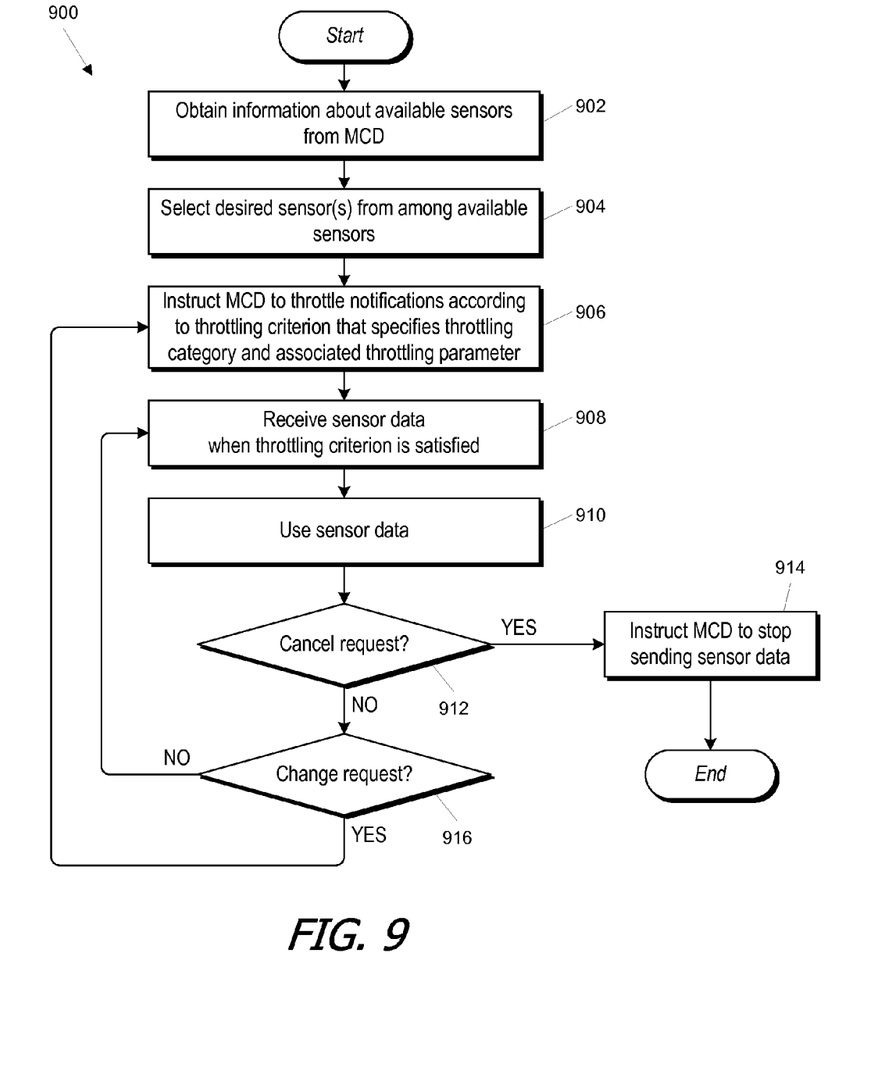
FIG. 9 is a flow diagram of a process that can be used by an accessory to obtain sensor data from a mobile computing device according to an embodiment of the present invention.

FIG. 9 is a flow diagram of a process 900 that can be used by an accessory (e.g., accessory 604 of FIG. 6) to obtain sensor data from an MCD (e.g., MCD 602 of FIG. 6) according to an embodiment of the present invention. Process 900 starts when an accessory and an MCD are connected. At block 902, accessory 604 can obtain from MCD 602 sensor information identifying available sensors. For example, accessory 604 can send a GetSensorNotify command to MCD 602 and receive a RetSensorNotify command in response.

At block 904, accessory 604 can select one or more of the available sensors as a desired sensor (i.e., a sensor for which the accessory should receive data) and can communicate the selection to MCD 602. For example, the accessory can send a SetSensorNotify command to identify the sensor(s) for which data should be sent.

At block 906, accessory 604 can specify a throttling criterion for sensor data updates, e.g., by sending a SetSensorThrottle command. The throttling criterion can specify a throttling category (e.g., a time interval category as shown in FIG. 2, a magnitude-of-change category as shown in FIG. 3, a threshold-crossing category as shown in FIG. 4, or a rate-of-change category as shown in FIG. 5) and a throttling parameter associated with the category (e.g., a time interval t2 for the time interval category, a change amount d3 for the magnitude-of-change category, thresholds $r_{up}$ and/or $r_{dn}$, for the threshold-crossing category, or a minimum rate of change for the rate-of-change category). If multiple sensors are selected, accessory 604 can separately specify a throttling criterion for each such sensor.

At block 908, accessory 604 can receive sensor data whenever the applicable throttling criterion is satisfied. The determination as to whether the throttling criterion is satisfied is made by MCD 602, and block 908 may include waiting for a time period that is not knowable in advance by accessory 604. While process 900 is waiting for sensor data, accessory 604 can continue to perform other operations (e.g., outputting audio and/or video received from MCD 602). As sensor data is received, accessory 604 can use the data in any manner desired at block 910 (e.g., adjusting display brightness based on ambient light).

In addition, at block 912, accessory 604 can determine whether to cancel a request for sensor data. If the request should be canceled, then at block 914, accessory 604 can instruct MCD 602 to stop sending sensor data for the affected sensor (e.g., by sending a new SetSensorNotify command as described above). Thereafter, process 900 can end, or if other requests for sensor data remain active, process 900 can return to block 908 to receive data from other sensors.

At block 916, accessory 604 can determine whether to modify the request. For example, in the case of time-based criteria, the accessory may determine that updates should be sent more frequently or less frequently. If the request is to be modified, process 900 can return to block 906 to provide a new throttling instruction to MCD 602. If the request is not modified, process 900 can continue to receive sensor data at block 908.

In some embodiments, process 900 can continue until accessory 604 instructs MCD 602 to stop sending any sensor data (e.g., using a SetSensorNotify command specifying that data should not be sent for any sensor) or until accessory 604 becomes disconnected, at which point process 900 can end.

It will be appreciated that the sensor-data communication processes described herein are illustrative and that variations and modifications are possible. Steps described as sequential may be executed in parallel, order of steps may be varied, and steps may be modified, combined, added or omitted. For instance, in some embodiments, an accessory may request data from multiple sensors, and data from each sensor can be independently managed.

The accessory can use the sensor data for any purpose desired. In some embodiments, the accessory can update its own settings or invoke its own functionality based on received sensor data. For instance, an accessory that can display a map can update the map based on GPS sensor information provided by the MCD. As another example, an accessory can adjust its own display brightness based on data from an ambient light sensor in the MCD.

In some embodiments, the accessory can control operation or settings of the MCD based on received sensor data. For example, if the accessory is receiving location data (e.g., based on a GPS sensor), the accessory can detect when the MCD enters a different country or time zone and can instruct the MCD to update its time zone and/or language settings using appropriate control commands (which can be part of the communication protocol defined for communication with the MCD). In some embodiments, the accessory can invoke applications on the MCD or select options within an application.

In addition, while the processes described herein provide transfer of sensor data from the MCD to the accessory, similar processes can be implemented to provide transfer of sensor data from an accessory to an MCD. In that case, the accessory can implement a process similar to process 800 while the MCD implements a process similar to process 900. In such embodiments, the MCD can control its own operations and/or operations of the accessories based on the received sensor data.

The throttling techniques described herein can be used to reduce the bandwidth needed to provide real-time sensor data from one device to another (e.g., from an MCD to an accessory or vice versa) while still delivering sufficient sensor data to support operation of the receiving device. Particular throttling criteria—including throttling categories and associated throttling parameters—can be determined by the receiving device based on various considerations, such as what information is needed for a particular application or operation, available bandwidth in the link between the sending and receiving devices, processing capability of the accessory, and the like. The selection of throttling criteria is made by the device that will receive (and potentially make use of) the communicated data, which allows the receiving device to optimize the data that is sent based on its specific needs. This can reduce the amount of bandwidth that is "wasted" sending sensor data that is not of interest to the receiving device.

While the invention has been described with respect to specific embodiments, one skilled in the art will recognize that numerous modifications are possible. For example, in some embodiments, an accessory (or other receiving device) can specify a logical combination of multiple throttling criteria. For example, the accessory can request that sensor data be sent every $t_2$ seconds or whenever a rate of change in some interval smaller than $t_2$ exceeds a threshold magnitude. Where the accessory requests data from multiple sensors, the criterion (or criteria) for each sensor can be specified independently. For example, the accessory can request that accelerometer data be sent once every 0.1 seconds and that ambient light data be sent only when a threshold is crossed.

In some embodiments, the accessory (or other receiving device) can also specify a format or precision for sending sensor data in addition to a throttling criterion. For example, the MCD (or other sending device) may have an ambient light sensor capable of resolving a thousand or more gradations of light, but the accessory may only be interested in whether the ambient light level is above or below certain thresholds (e.g., $r_{up}$ and $r_{dn}$, in the example of FIG. 4). In that case, the accessory can request that the MCD send a small number of bits (e.g., two bits would suffice for the case of two thresholds) to convey the needed information more compactly, further reducing the bandwidth required.

Further, in certain embodiments described above, the sensors reside in the MCD and are communicated to the accessory in response to the accessory's request. Those skilled in the art will recognize that sensors can also be implemented in an accessory and that data from accessory sensors can be provided to an MCD using techniques akin to those described herein, with roles of MCD and accessory reversed. More generally, techniques described herein can be adapted to provide sensor data from one electronic device to another electronic device, provided that the two devices are capable of communicating with each other. In some embodiments, both device may have sensors capable of producing data that is of use to the other device, in which case each device may act as a sending device with respect to its own sensors and a receiving device with respect to sensors in the other device.

Further still, although embodiments described above make specific reference to a mobile computing device, those skilled in the art will appreciate that techniques described herein can be applied to any type of computing device including but not limited to mobile devices (e.g., smart phones, tablet computers, laptop computers, or the like) and stationary devices (e.g., desktop computer systems, servers, etc.). Likewise, an accessory can be any peripheral device suitable for operation with a given computer system or computing device.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable media encoded with the program code may be packaged with a compatible electronic device, or the program code may be provided separately from electronic devices (e.g., via Internet download).

Thus, although the invention has been described with respect to specific embodiments, it will be appreciated that the invention is intended to cover all modifications and equivalents within the scope of the following claims.

What is claimed is:

1. A method for use in a first electronic device having a sensor, the method comprising:
    establishing, by the first electronic device, a communication link with a second electronic device;
    receiving via the communication link, by the first electronic device, a request from the second electronic device for sensor data from a stream of sensor data values produced from the sensor of the first electronic device and a throttling criterion associated with the request, wherein the throttling criterion identifies a selected throttling category from a plurality of throttling categories and a throttling parameter specific to the selected throttling category;
    obtaining, by the first electronic device, a sequence of updated sensor data values from the stream of sensor data values produced from the sensor; and
    for each updated sensor data value:
        determining, by the first electronic device, whether the updated sensor data value satisfies the throttling criterion; and
        in response to determining that the updated sensor data value satisfies the throttling criterion, sending, by the first electronic device, the updated sensor data value to the second electronic device via the communication link, wherein the first electronic device controls an amount of sensor data that is sent to the second electronic device based on the throttling criterion.

2. The method of claim 1 wherein the plurality of throttling categories includes two or more of a time interval category, a magnitude of change category, a threshold crossing category, and a rate of change category.

3. The method of claim 1 wherein the first electronic device is a computing device and the second electronic device is an accessory.

4. The method of claim 1 wherein the second electronic device is a computing device and the first electronic device is an accessory.

5. A computer program product comprising a computer readable storage medium encoded with program instructions that, when executed by a processor in a computing device communicably coupled with an accessory, cause the processor to execute a method comprising:
    receiving, by the computing device, a request from the accessory for sensor data from a stream of sensor data values produced from a sensor of the mobile computing device;
    receiving, by the computing device, a throttling criterion associated with the request, wherein the throttling criterion specifies one of a plurality of throttling categories and a throttling parameter specific to the throttling category;
    subsequently to receiving the throttling criterion, obtaining an updated sensor data value from the stream of sensor data values produced from the sensor and determining whether the updated sensor data value satisfies the throttling criterion; and
    sending the updated sensor data value to the accessory in response to determining that the updated sensor data value satisfies the throttling criterion, wherein the computing device controls an amount of sensor data that is sent to the acessory based on the throttling criterion.

6. The computer program product of claim 5 wherein the plurality of throttling categories includes two or more of a time interval category, a magnitude of change category, a threshold crossing category, and a rate of change category.

7. The computer program product of claim 6 wherein, in the event that the throttling criterion specifies the time interval category, the throttling parameter specifies a time interval such that the updated sensor data value is sent in the event that the time interval has elapsed since a previous sending of sensor data.

8. The computer program product of claim 6 wherein, in the event that the throttling criterion specifies the magnitude of change category, the throttling parameter specifies a minimum magnitude of change between a previous sensor data value and the updated sensor data value, wherein the updated sensor data value is sent in the event that an actual magnitude of change is at least equal to the minimum magnitude of change.

9. The computer program product of claim 6 wherein, in the event that the throttling criterion specifies the threshold crossing category, the throttling parameter specifies a threshold value, wherein the updated sensor data value is sent in the event that a previous sensor data value and the updated sensor data value are on different sides of the threshold.

10. The computer program product of claim 6 wherein, in the event that the throttling criterion specifies the rate of change category, the throttling parameter specifies a minimum magnitude of change between a previous sensor data value and the updated sensor data value and a time interval over which a change in the sensor data value is to be measured, wherein the updated sensor data value is sent in the event that a measured magnitude of change during the time interval exceeds the minimum magnitude of change.

11. A computing device comprising:
    a plurality of sensors that each provide a stream of sensor data values;
    an accessory interface; and
    a processor coupled to the plurality of sensors and the accessory interface, the processor being configured to:
        communicate to an accessory, via the accessory interface, information about the plurality of sensors;
        receive from the accessory, via the accessory interface, a first request for sensor data from a first stream of sensor data values provided from a first one of the plurality of sensors and a first throttling criterion associated with the first request, wherein the first throttling criterion identifies a selected first throttling category from a plurality of throttling categories and a first throttling parameter specific to the first throttling category;

receive an updated sensor data value from the first one of the plurality of sensors;

determine whether the updated sensor data value satisfies the first throttling criterion; and send the updated sensor data to the accessory via the accessory interface in response to determining that the updated sensor data value satisfies the first throttling criterion, wherein the computing device controls the amount of sensor data from the first sensor that is sent to the accessory based on the throttling criterion.

12. The computing device of claim 11 wherein the plurality of sensors includes at least one of:
an ambient light sensor;
a proximity sensor;
an accelerometer; or
a magnetometer.

13. The computing device of claim 11 wherein the accessory interface includes a connector having a plurality of signal pins.

14. The computing device of claim 11 wherein the accessory interface includes a wireless interface.

15. The computing device of claim 11 wherein the computing device is a mobile computing device.

16. The computing device of claim 11 wherein the processor is further configured to:

receive from the accessory, via the accessory interface, a second request for sensor data from a second stream of sensor data values provided from a second one of the plurality of sensors and a second throttling criterion associated with the second request, wherein the second throttling criterion identifies a selected second throttling category from the plurality of throttling categories and a second throttling parameter specific to the second throttling category;

receive an updated sensor data value from the second one of the plurality of sensors;

determine whether the updated sensor data value from the second one of the plurality of sensors satisfies the second throttling criterion; and send the updated sensor data value from the second one of the plurality of sensors to the accessory via the accessory interface in response to determining that the updated sensor data value from the second one of the plurality of sensors satisfies the second throttling criterion, wherein the computing device controls the amount of sensor data from the second sensor that is sent to the accessory based on the second throttling criterion.

17. The computing device of claim 16 wherein the first throttling category and the second throttling category are different.

18. The computing device of claim 16 wherein the first throttling category and the second throttling category are the same and wherein the first throttling parameter and the second throttling parameter are different.

19. A method for use in an accessory, the method comprising:
establishing communication with a computing device;
receiving from the computing device sensor information identifying a plurality of available sensors;

requesting from the computing device sensor data from a stream of sensor data values produced from a selected sensor from the plurality of available sensors;

instructing the computing device to throttle the sensor data in accordance with a throttling criterion that specifies one of a plurality of throttling categories and a throttling parameter specific to the throttling category, wherein instructing the mobile computing device to throttle the notifications includes providing the throttling criterion to the mobile computing device;

receiving from the computing device a sequence of notifications, the notifications including sensor data produced from the selected sensor, wherein the notifications are sent in response to the throttling criterion being satisfied and wherein the computing device controls the amount of sensor data that is sent to the accessory based on the throttling criterion.

20. The method of claim 19 wherein the computing device is a mobile computing device.

21. The method of claim 19 further comprising:
sending a control command to the computing device based on the received sequence of notifications, wherein the control command instructs the computing device to perform an operation.

22. An accessory comprising:
a component;
a computing device interface; and
a controller coupled to the component and the computing device interface, the controller being configured to:
send to a computing device, via the computing device interface, a request to receive sensor data from a stream of sensor data values produced from a sensor of the computing device;
send to the computing device, via the computing device interface, a throttling criterion associated with the request, wherein the throttling criterion specifies one of a plurality of throttling categories and a throttling parameter specific to the throttling category; and
receive the sensor data from the computing device, via the computing device interface, wherein receipt of the sensor data corresponds to the throttling criterion being satisfied and wherein the computing device controls the amount of sensor data that is sent to the accessory based on the throttling criterion.

23. The accessory of claim 22 wherein the controller is further configured to control an operation of the component based at least in part on the received sensor data.

24. The accessory of claim 23 wherein the sensor comprises an ambient light sensor and the component comprises a display.

25. The method of claim 1 further comprising:
in response to determining that the updated sensor data value does not satisfy the throttling criterion, not sending, by the first electronic device, the updated sensor data value to the second electronic device via the communication link.

26. The method of claim 25 wherein the plurality of throttling categories includes two or more of a time interval category, a magnitude of change category, a threshold crossing category, and a rate of change category.

27. The computing device of claim 11 wherein the processor is further configured to not send the updated sensor data value to the accessory via the accessory interface in response to determining that the updated sensor data value does not satisfy the first throttling criterion.

28. The computing device of claim 27 wherein the plurality of sensors includes at least one of:

an ambient light sensor;
a proximity sensor;
an accelerometer; or
a magnetometer.

\* \* \* \* \*

UNITED STATES PATENT AND TRADEMARK OFFICE
CERTIFICATE OF CORRECTION

| | | |
|---|---|---|
| PATENT NO. | : 9,501,100 B2 | Page 1 of 1 |
| APPLICATION NO. | : 12/967917 | |
| DATED | : November 22, 2016 | |
| INVENTOR(S) | : Sylvain R. Y. Louboutin, Robert J. Walsh and Shyam S. Toprani | |

It is certified that error appears in the above-identified patent and that said Letters Patent is hereby corrected as shown below:

Claim 5, Line 24 (Column 20, Line 21): Delete "acessory" and insert --accessory--.

Signed and Sealed this
Seventh Day of February, 2017

Michelle K. Lee
*Director of the United States Patent and Trademark Office*